United States Patent Office 2,780,519
Patented Feb. 5, 1957

2,780,519

RECOVERY OF URANIUM FROM ORES

David Kaufman, Cambridge, and Sara E. Bailey, Brookline, Mass., assignors to the United States of America as represented by the United States Atomic Energy Commission No Drawing. Application December 21, 1950,
Serial No. 202,134

5 Claims. (Cl. 23—14.5)

This invention relates to a process for recovering uranium from its ores, and more particularly it relates to a selective precipitation process for recovering uranium from acid leach liquors which contain relatively high concentrations of dissolved silicates, iron salts, aluminum salts and alkaline earth metal salts and a relatively low concentration of dissolved uranium salts and which are derived by the acid leaching of low grade uranium ores. This invention also extends to the up-grading of the low grade uranium containing precipitates which are obtained from these acid leach liquors by neutralization with an alkali such as magnesia. This latter embodiment of the present invention involves leaching of said precipitates with acid followed by selective precipitation of the uranium values from the leach solution thus obtained.

Acid leach liquors obtained from low grade uranium containing ores or precipitates frequently contain large amounts of dissolved iron, aluminum and silica. Neutralization of these acid leach liquors with an alkali results in an unselective precipitation of the uranium along with iron, aluminum and silica. When the amount of uranium dissolved in these leach liquors is low in comparison to the amount of dissolved iron, aluminum and silica, it has been found to be extremely difficult to obtain high grade uranium containing precipitates therefrom, since practically all reagents which are effective for precipitating the uranium from these liquors also bring down the dissolved iron, aluminum and silica.

This invention has as an object the provision of a selective precipitation process for recovering uranium values from acid leach liquors which also contain dissolved silicates, iron salts, aluminum salts and alkaline earth metal salts. A further object of the invention is to provide a novel process for up-grading low-grade uranium containing precipitates which are obtained by neutralization of acid leach liquors which contain dissolved silicates, iron salts, aluminum salts and alkaline earth metal salts in addition to dissolved uranium. A still further object is to generally improve the technique of isolating uranium from low grade ores by acid leaching followed by selective precipitation. Another object is to provide a process for utilizing phosphate reagents for the selective precipitation of uranium from acid liquors. Still another object is to provide a process for treating the uranium phosphate containing precipitate thus obtained to enrich it by removing phosphate values therefrom. Other objects will appear hereinafter.

These objects are accomplished by the present invention in accordance with which acid leach liquors derived from low grade uranium containing ores by leaching said ores with sulfuric acid in the presence of an oxidizing agent such as ferric sulfate or manganese dioxide are reduced by reaction with a metallic reducing agent to reduce the dissolved uranium to the tetravalent (uranous) state followed by the addition of a water soluble phosphate thereto to effect the selective precipitation of a uranous phosphate. Instead of leaching a low-grade uranium containing ore to obtain a leach liquor which is then reduced and from which reduced liquor the uranium is selectively precipitated by the addition of a phosphate reagent thereto, it also falls within the scope of the present invention to obtain a low-grade uranium containing precipitate by neutralization of the acid leach liquor obtained from such a low-grade uranium containing ore and then to upgrade said uranium containing precipitate by leaching this precipitate with acid followed by reduction of the uranium contained in this leach solution to the tetravalent (uranous) state and the addition of a water soluble phosphate to effect the selective precipitation of a uranous phosphate therefrom.

The acid leach liquors which are obtained either by leaching a low grade uranium containing ore or a low grade uranium containing precipitate as indicated in the preceding paragraph contain low concentrations of dissolved uranium salts and high concentrations of dissolved silicates, iron salts, aluminum salts, and alkaline earth metal salts. The uranium in these acid leach liquors is mostly in the hexavalent (uranyl) state. It was found that when phosphate reagents were added to these acid leach liquors in order to precipitate uranyl phosphate therefrom, aluminum and ferric phosphate also precipitated so that the contaminated uranium containing precipitates were low in grade. Applicants discovered that uranous phosphates precipitate at a pH at least one unit lower than the pH at which aluminum phosphates precipitate. Applicants also found that ferrous phosphates do not precipitate at the low pH values at which uranous phosphates precipitate. Based upon these discoveries, applicants evolved the selective uranous phosphate precipitation process which forms the subject matter of the present invention. They found that by reducing an acid leach liquor containing hexavalent uranium, ferric iron, and aluminum ions so that the dissolved uranium was reduced to the tetravalent state and the dissolved iron was reduced to the ferrous state they could selectively precipitate the uranium therefrom without substantial co-precipitation of aluminum or iron taking place. This selective precipitation of uranium as a uranous phosphate therefore results in the formation of a precipitate that is not highly contaminated with aluminum and iron.

While in the examples below iron has been employed to reduce dissolved uranium from the hexavalent to the tetravalent state, it is feasible to use other metallic reducing agents such as a Jones reductor, zinc, or aluminum. Iron is preferred because of its relative cheapness. In order to effectively use metallic iron to reduce dissolved uranium to the tetravalent state, it is desirable that the pH of the leach liquor be adjusted to 1.0 to 1.5 before the leach liquor is contacted with the iron. Iron not dissolved in any cycle may be used in a subsequent cycle.

After the uranium in the leach liquor has been reduced to the tetravalent (uranous) state, it may be precipitated therefrom by the addition thereto of an orthophosphate such as disodium phosphate ($Na_2HPO_4$) or diammonium phosphate, or a pyrophosphate such as tetrasodium pyrophosphate ($Na_4P_2O_7$). Any pyrophosphate or orthophosphate compound which will dissolve in acid, remain in solution at a pH of 1.5, and ionize to form pyrophosphate or acid phosphate ions is capable of causing precipitation of uranous uranium from the reduced leach liquors described herein. When tetrasodium pyrophosphate is used as the precipitating reagent best results are obtained when from 1.1 to 2.0 times the stoichiometric amount of this reagent is used to precipitate the uranium.

While both orthophosphates and pyrophosphates are alternate reagents for effecting the precipitation of uranous uranium from these reduced leach liquors, the pyrophosphates are so much superior to the orthophosphates for accomplishing this precipitation that the pyrophosphates should not be regarded just as the mere equivalents of the orthophosphates for this purpose. The superiority of pyrophosphates to orthophosphates for accomplishing this precipitation is shown in the experimental work described in the next paragraph.

A leach liquor such as that described below in Example 2 was reduced with iron powder at a pH of 1.2. The reduced solution was filtered and divided into two portions of 1 liter each. One portion was precipitated with two times the stoichiometric amount of trisodium orthophosphate (assuming the formula of the precipitated uranous orthophosphate to be $U_3(PO_4)_4$). The other portion was precipitated with two times the stoichiometric amount of tetrasodium pyrophosphate (assuming the formula of the precipitated uranous pyrophosphate to be $UP_2O_7$). Results of these tests showed that 76% of the uranium was precipitated when trisodium orthophosphate was employed as the precipitating reagent while 92% of the uranium was precipitated when tetrasodium pyrophosphate was used as the precipitating reagent.

The uranous phosphate containing precipitates obtained in accordance with the selective uranium precipitation process described herein are generally reacted with an alkali metal hydroxide such as NaOH. This reaction converts the uranous phosphate in the precipitate to uranous hydroxide. This removal of phosphate values from the uranous phosphate containing precipitate serves to enhance the proportion of uranium present in the final products obtained in accordance with the present invention.

While the uranous phosphate precipitation methods described in this specification are applicable to leach liquors derived from a wide variety of uranium containing ores, they have been found to be especially useful for selectively precipitating uranium from sulfuric acid leach liquors obtained from ores that assay less than 0.2% in $U_3O_8$ or from sulfuric acid extracts of low grade hydroxide precipitates which were derived from these sulfuric acid leach liquors. The ores to which this invention is particularly applicable and on which the greater part of the experimental work described in this specification has been performed are all mineralogically similar being composed of quartz pebbles surrounded by a quartzitic matrix in which the valuable minerals occur. The ores typically contain about 10 percent of foliated silicate minerals, which may be either sericite or pyrophyllite or both. In addition they contain pyrite, uraninite, carbonaceous material, gold, and very small quantities of heavy minerals such as ilmenite, rutile, chromite, magnetite, zircon and tourmaline. The pyrite content of these ores varies from about 1 percent to about 3 percent. The pyrite is rich in gold, but does not have much uraninite associated with it. The carbonaceous material in these ores is a fragile hydrocarbon mineral of low specific gravity which is rich in both gold and uraninite. Uraninite is the only uranium mineral of importance in these ores. It occurs free and as locked particles with other mineral constitutents of the ores, especially hydrocarbon. The gold content of these ores may vary from about 0.005 oz. to about 3.4 oz. per ton. The $U_3O_8$ content of these ores may vary from about 0.001% to about 0.17% depending on richness of vein and selectivity of mining.

Instead of processing the ores as they are mined and crushed it is frequently preferred to apply the invention to ore residues which remain after the ores have been leached with a cyanide solution to extract the gold from the ore. These cyanided residues frequently contain about 1% of metallic iron, weathered aluminum silicates, and some lime derived from the cyanide leaching in addition to the minerals mentioned in the preceding paragraph. These cyanided ore residues generally assay from 0.015% to 0.030% in $U_3O_8$, from 2% to 3% in Fe, from 85% to 88% in $SiO_2$, from 7% to 9% in $Al_2O_3$, from 1% to 4% in CaO, and from 1% to 2% in MgO.

When ores and ore residues such as those described in the two preceding paragraphs are leached using sulfuric acid and an oxidizing agent in the manner described in Example 2 below, the pregnant leach solutions produced, if filters are used for dewatering, generally contain about 2 to 8 grams of ferrous iron, 1 to 3 grams of alumina, 0.1 to 3 grams of ferric iron, 1 to 2 grams of silica, and 0.07 to 0.3 grams of $U_3O_8$ per liter. The concentrations of these different constituents in the leach solutions vary not only with the composition of the ore being leached but also with variations in the leaching technique which is employed.

This invention is also applicable for upgrading the low grade hydroxide precipitates which are made by treating sulfuric acid leach liquors of the previously described ores with a precipitating agent such as caustic calcined magnesia. These precipitates usually analyze from 1% to 5% in $U_3O_8$, from 5% to 15% in Fe, from 10% to 30% in $Al_2O_3$, from 5% to 20% in $SiO_2$, from 5% to 20% in CaO, and from 5% to 15% in MgO. These precipitates are extracted with sulfuric acid and then the soluble uranium in these extracts is reduced to the uranous state and selectively precipitated by the addition of a water soluble phosphate to said extract.

The following examples illustrate but do not limit the invention.

*Example 1*

10 kilograms of a wet ore residue of the type described above from which precious metals had been extracted by cyanide leaching and which contained 14.3% of moisture and assayed 0.017% in $U_3O_8$, 2.3% in Fe, 86% in $SiO_2$, 7% in $Al_2O_3$, 1.7% in CaO and 2% in MgO on a dry basis were charged to a lead-lined Pachuca tank. 7.4 liters of water were added to the ore charge in the tank. 225.7 grams of sulfuric acid (sp. gr. 1.84) and 53.4 grams of $MnO_2$ were also added to the Pachuca, and the contents thereof were agitated for 24 hours to effect the leaching of uranium values therefrom. Enough $MnO_2$ was used to convert all iron dissolved from the ore charge to the ferric state. At the end of the leach the pH of the slurry was 1.5. An aqueous slurry containing 90 grams of limestone was added at intervals over a period of two hours to the mixture of leached ore and leach liquor in a Pachuca tank and after the last addition of limestone, agitation was continued for 2 hours more. The pH of the partially neutralized slurry was 3.3 and much of the dissolved iron that was in the ferric state was precipitated. The pregnant leach liquor was separated from the leached residue by filtration. 5.56 liters of pregnant solution having a pH of 3.3 and assaying 0.187 gram of $U_3O_8$ per liter were thereby obtained. The wet leached residue was washed with 4 liters of water, and 5.32 liters of a wash solution assaying 0.113 gram of $U_3O_8$ per liter were thus obtained. The washed and leached residue assayed 0.0045% in $U_3O_8$. To the 5.56 liters of pregnant solution mentioned above there were added first 40 grams of concentrated sulfuric acid and then 5 grams of iron powder. After 30 minutes of agitation with the iron powder a solution having a pH of 1.1 and the dissolved uranium in the uranous state was obtained. Excess iron powder was filtered off, and to the reduced solution there was added 1.74 grams of tetrasodium pyrophosphate dissolved in 100 to 200 milliliters of water. A precipitate containing uranous pyrophosphate formed immediately and was allowed to settle for 24 hours. At the end of this settling period the clear supernatant barren solution was siphoned off, and the slurry of precipitate was further dewatered and collected in a centrifuge. Both the wash solution and barren solution were reserved.

In the next succeeding cycle in the present series of locked-batch leaching tests a second charge of 10 kilograms of the same wet ore residue was leached by agitating it in a Pachuca tank for 24 hours with 7.4 liters of water, 250 grams of $H_2SO_4$ (sp. gr. 1.84) and 50 grams of $MnO_2$. At the end of this time the leach liquor had a pH of 1.2. An aqueous slurry containing 90 grams of limestone was then added at intervals over a period of 4 hours to the mixture of leached ore and leach liquor in the Pachuca tank. This addition of $CaCO_3$ caused the pH of the leach liquor to rise to 3.2 and caused much of the dissolved iron that was in the ferric state to precipitate. The leached residue was then separated from the partially neutralized pregnant solution by filtration, and 7.81 liters of a pregnant solution having a pH of 3.2 and assaying 0.144 gram of $U_3O_8$ per liter was obtained. The wet leached residue was washed with 4 liters of water and 4.65 liters of a wash solution assaying 0.001 gram of $U_3O_8$ per liter were thereby collected. The washed and leached residue analyzed 0.0052% in $U_3O_8$. The 7.81 liters of pregnant solution were acidified with 40 grams of concentrated $H_2SO_4$ and then agitated for 30 minutes with 5 grams of iron powder to reduce the dissolved uranium to the uranous state. Excess iron powder was filtered off and to the reduced solution there was added 1.74 grams of tetrasodium pyrophosphate dissolved in 100 to 200 milliliters of water. A precipitate containing uranous pyrophosphate formed immediately and was allowed to settle for 24 hours, at the end of which time the clear supernatant barren solution was siphoned off, and the slurry of precipitate was further dewatered by centrifuging. Wash and barren solutions were reserved.

In the next succeeding cycle in the present series of locked-batch leaching tests a third charge of 10 kilograms of the same wet ore residue was pulped up in a Pachuca with 4 liters of wash solution obtained from the first cycle described in the first paragraph of this example and with 3.4 liters of barren solution that was obtained after the precipitation and separation of the uranous pyrophosphate in the first cycle. To the pulped up ore residue there was added 200 grams of $H_2SO_4$ (sp. gr. 1.84) and 43.5 grams of $MnO_2$. Agitation in the Pachuca was carried on for 24 hours at the end of which time the leach liquor had a pH of 1.7. An aqueous slurry of 100 grams of limestone was then added at intervals over a period of 4 hours. This addition of $CaCO_3$ partially neutralized the leach liquor and increased its pH to 3.4. The pregnant leach liquor was then separated from the leached residue by filtration whereby 9.9 liters of a pregnant solution analyzing 0.156 gram of $U_3O_8$ per liter was collected. The leached residue was washed with 2 liters of water and 2 liters of the barren solution that remained after the uranous pyrophosphate precipitation of the first cycle described in the first paragraph of this example. There was thus obtained 4 liters of a wash solution that assayed 0.025 gram of $U_3O_8$ per liter. To the 9.9 liters of pregnant solution that were obtained in the present cycle there were first added 40 grams of sulfuric acid and then 5 grams of iron powder. After agitation for 30 minutes the reduced solution was separated by filtration from undissolved iron powder. To the reduced solution there was added 1.74 grams of tetrasodium pyrophosphate dissolved in 100 to 200 milliliters of water. A precipitate containing uranous pyrophosphate formed immediately and was allowed to settle for 24 hours, at the end of which time the clear supernatant barren solution was siphoned off, and the slurry of precipitate was further dewatered by centrifuging.

The next five cycles of the present series of leaching tests were carried out in a manner very similar to that described for the preceding cycle in the preceding paragraph of this example. The new batches of ore in the cycles with even numbers were pulped up with a mixture of barren and wash solution and the residues washed with barren solution from the preceding even-numbered cycles. Correspondingly, in the cycles with odd numbers, the repulping solution and the wash liquor was obtained from the preceding odd-numbered cycles. By utilizing wash and barren solutions from preceding cycles, a large proportion of the water was reused and any uranium in these recycled liquors was recovered. The amount of ore leached in subsequent cycles was 10 kilograms as in the preceding cycles, but the amount of sulfuric acid used varied from 205 to 241 grams, the amount of $MnO_2$ used varied from 43.5 to 64.5 grams and the amount of limestone used varied from 100 to 125 grams. The amount of sodium pyrophosphate used to precipitate uranous phosphate from the reduced leach liquors also varied from 2 to 3 grams. The following table shows the amounts of reagents employed and results obtained in all eight cycles of this series of leaching tests.

86% in $SiO_2$, 7% in $Al_2O_3$, 1.7% in $CaO$ and 2% in $MgO$ on a dry basis were charged to a lead-lined Pachuca

TABLE 1

| Cycle | Initial | 1 | 2 | 3 | 4 | 5 | 6 | 7 |
|---|---|---|---|---|---|---|---|---|
| Leaching: | | | | | | | | |
| Charge of wet ore, kg | 10 | 10 | 10 | 10 | 10 | 10 | 10 | 10 |
| Sulfuric acid, grams | 225.7 | 250 | 200 | 205 | 206 | 240 | 238 | 241 |
| Manganese dioxide, grams | 53.4 | 50 | 43.5 | 43.5 | 43.5 | 64.5 | 64.5 | 64.5 |
| Wash soln, liters | None | None | 4.0 | 4.0 | 4.0 | 4.9 | 4.0 | 3.3 |
| Barren soln, liters | None | None | 3.4 | 3.4 | 4.5 | 3.4 | 3.4 | 2.2 |
| Water, liters | 7.4 | 7.4 | None | None | None | None | None | None |
| Final pH | 1.5 | 1.2 | 1.7 | 1.7 | 1.6 | 1.4 | 1.5 | 1.4 |
| Wet ore, percent moisture | 14.3 | 14.3 | 14.3 | 14.3 | 14.3 | 14.3 | 14.3 | 14.3 |
| Dry ore, percent $U_3O_8$ | 0.017 | 0.017 | 0.017 | 0.017 | 0.017 | 0.017 | 0.017 | 0.017 |
| Neutralization: | | | | | | | | |
| Limestone, grams | 90 | 90 | 100 | 100 | 100 | 125 | 125 | 125 |
| Pulp, pH | 3.3 | 3.2 | 3.4 | 3.1 | 3.4 | 3.3 | 3.2 | 3.55 |
| Pregnant soln, liters | 5.56 | 7.81 | 9.90 | 7.66 | 7.85 | 7.64 | 7.75 | 7.50 |
| Assay $U_3O_8$, g./l | 0.187 | 0.144 | 0.156 | 0.163 | 0.135 | 0.164 | 0.205 | 0.200 |
| Washing the Leach Residue: | | | | | | | | |
| Water, liters | 4.0 | 4.0 | 2.0 | 2.0 | 1.2 | 2.0 | 2.0 | None |
| Barren soln, liters | None | None | 2.0 | 2.0 | 2.8 | 2.0 | 2.0 | 6.0 |
| Wash soln, liters | 5.32 | 4.65 | 4.0 | 4.9 | 4.0 | 3.4 | 6.25 | 6.0 |
| Assay $U_3O_8$, g./l | 0.113 | 0.001 | 0.025 | 0.045 | 0.061 | 0.046 | 0.028 | 0.070 |
| Leached residue, kg | 8.64 | 8.3 | 8.65 | 8.76 | 8.6 | 8.8 | 8.68 | 8.7 |
| Assay $U_3O_8$, percent | 0.0045 | 0.0052 | 0.0045 | 0.0034 | 0.0042 | 0.0043 | 0.0030 | 0.0031 |
| Reduction: | | | | | | | | |
| Sulfuric acid, grams | 40 | 40 | 40 | 40 | 40 | 40 | 40 | 40 |
| Fe powder, grams | 5 | 5 | 5 | 5 | 5 | 5 | 5 | 3 |
| pH after reduction | 1.1 | 1.3 | 1.5 | 1.3 | 1.4 | 1.4 | 1.4 | 1.4 |
| Time of reduction, min | 30 | 30 | 30 | 30 | 30 | 30 | 30 | 30 |
| Precipitation: | | | | | | | | |
| $Na_4P_2O_7$, grams | 1.74 | 1.74 | 1.74 | 2.3 | 2.3 | 2.0 | 2.3 | 3.0 |
| Barren soln, liters | 5.4 | 7.8 | 9.8 | 8.1 | 8.4 | 8.3 | 8.0 | 8.1 |
| Assay $U_3O_8$, g./l | 0.012 | 0.0097 | 0.014 | 0.015 | 0.0084 | 0.012 | 0.0083 | 0.022 |
| Free acid, g./l | 5.15 | 3.48 | 2.7 | 2.94 | 3.43 | 4.21 | | |
| Barren soln bleed, liters | 2.0 | 2.41 | 1.8 | 2.58 | 2.9 | None | 2.0 | None |

From 3 to 5 grams of uranous pyrophosphate precipitate were obtained in each cycle as a slurry containing 2.5% solids. The solids content of this slurry was raised to about 10% by centrifuging.

The combined wet uranous pyrophosphate precipitates obtained from the eight cycles of operation described above were agitated for 30 minutes with 60 grams of dry NaOH. This treatment with NaOH served to remove the pyrophosphate radical from the precipitate. The final precipitate obtained after the NaOH treatment, dilution with 200 milliliters of water, and filtration weighed 13.3 grams and assayed 71.5% in $U_3O_8$. This precipitate contained 69.86% of the uranium values that were contained in the ore residue that was leached in all of the eight cycles described above. 20.31% of the uranium values in the ore were retained in the leached and washed residues. Analysis of barren and wash solutions which were not recycled in this limited series of locked-batch tests and of other losses which would not be incurred in a commercial scale operation of the invention described in this example indicated that a recovery of about 77% of the uranium values of the ore residue processed in this example could be obtained by following the instructions set forth in this example.

The cyclic test described in this example was unusual in that it really comprised two cyclic tests run concurrently. This procedure was followed as a matter of convenience in the laboratory. However, the procedure used in the following example is more typical and very much like one that might be used in plant operation.

In the present example the amount of reagents employed per ton of ore residue for leaching were found to be as follows: 52.2 pounds of $H_2SO_4$, 12.3 pounds of $MnO_2$ and 25.2 pounds of limestone. For precipitation the following quantities of reagents per ton of ore residue were used: 9 pounds of $H_2SO_4$, 1.1 pounds of iron powder, 0.5 pound of tetrasodium pyrophosphate and 1.7 pounds of sodium hydroxide.

*Example 2*

11.35 kilograms of a wet ore residue of the type described above from which precious metals had been extracted by cyanide leaching and which contained 10.4% of moisture and assayed 0.021% in $U_3O_8$, 2.3% in Fe, tank. 5.3 liters of water were charged to the tank and the ore was pulped. 250 grams of $H_2SO_4$ (sp. gr. 1.84) and 37.5 grams of $MnO_2$ were added to the ore pulp which was then agitated for 24 hours to effect the leaching of uranium values therefrom. The quantity of $MnO_2$ used was insufficient to oxidize all of the iron to the ferric state but sufficient to give maximum uranium extraction. At the end of the 24 hour leaching period the leach liquor had a pH of 1.9. An aqueous slurry containing 50 grams of limestone was then added at intervals over a period of 80 minutes to the mixture of leached ore and leach liquor in the Pachuca tank. This addition of $CaCO_3$ caused the pH of the leach liquor to increase to 3.3. Ferric iron was precipitated but unlike the previous example there was also ferrous iron present so the liquor still contained iron to the extent of 5 grams per liter or more. The leached residue was then separated from the pregnant leach liquor by filtration. The leach residue analyzed 0.0053% in $U_3O_8$ while 6.8 liters of a pregnant leach liquor having a pH of 3.1 and assaying 0.196 gram of $U_3O_8$ per liter were collected. The leached residue was washed on the filter with water and 6.65 liters of a wash solution having a pH of 2.4 were obtained. The 6.8 liters of pregnant leach liquor were acidified with 40 grams of $H_2SO_4$ and then agitated for 30 minutes with 5 grams of iron powder to reduce the dissolved uranium to the uranous state. Excess iron powder was filtered off, and to the reduced solution there was added 2.5 grams of tetrasodium pyrophosphate dissolved in 100 to 200 milliliters of water. A precipitate of uranous pyrophosphate formed immediately and was allowed to settle for 24 hours. At the end of this time the clear supernatant barren solution was siphoned off leaving the precipitate in a slurry containing about 2.5% solids. This precipitate slurry was further dewatered by centrifuging to about 10% solids. 7.3 liters of barren solution was obtained by separating precipitated uranous pyrophosphate from the liquor in which the uranium had been dissolved.

The next seven cycles in the present series of leaching tests were carried out in much the same way as the first cycle which was described in detail in the first paragraph of this example. A fresh 11.35 kilogram charge of the same wet ore residue was leached in each of the succeeding cycles using 275 grams of $H_2SO_4$ (sp. gr. 1.84) and 37.5 grams of $MnO_2$ as the leaching reagents. However, in leaching cycles 2 to 8 the wet ore residue was not pulped exclusively with fresh water. Instead, most of the water used in pulping the ore residue was wash solution derived from washing the leached residue of a preceding cycle. This recycling of wash solutions conserved water and prevented loss of the uranium that was dissolved in this wash solution. Furthermore, in the second and all succeeding cycles of this leaching test the leached ore residue on the filter was not washed with fresh water, but instead it was washed with barren solution from which the precipitated uranous pyrophosphate had been removed in the preceding cycle. This recycling of the barren solution conserved water and also served to prevent the loss of any uranium dissolved therein in as much as the barren solution of one cycle was used to wash the leached residue in the succeeding cycle and the wash solution obtained in said succeeding cycle was used in pulping the new charge of ore to be leached in the next cycle. The following table gives the pertinent data concerning all of the cycles in the present series of leaching tests.

operation of the invention described in this example indicated that a recovery of about 75% of the uranium values of the ore residue processed in this example could be obtained by following the instructions contained in this example.

In this example the amount of reagents employed per ton of ore residue for leaching were found to be as follows: 54.4 pounds of $H_2SO_4$, 7.5 pounds of $MnO_2$ and 19.8 pounds of limestone. For reduction and precipitation the following quantities of reagents per ton of ore residue were used: 9 pounds of $H_2SO_4$, 1 pound of iron powder, 0.5 pound of tetrasodium pyrophosphate, and 2.1 pounds of sodium hydroxide.

*Example 3*

This example illustrates the employment of uranous phosphate precipitation to upgrade a low grade uranium precipitate obtained by neutralizing a sulfuric acid leach liquor that was made by leaching a cyanided ore residue of the type described above.

An ore residue of the type described above which analyzed 0.025% in $U_3O_8$, 2.18% in Fe, 86.3% in $SiO_2$, 6.6% in $Al_2O_3$, 0.9% in CaO and 1.24% in MgO and

TABLE 2

| Cycle | 1 | 2 | 3 | 4 | 5 | 6 | 7 | 8 |
|---|---|---|---|---|---|---|---|---|
| Leaching: | | | | | | | | |
| Charge wet ore, kg | 11.35 | 11.35 | 11.35 | 11.35 | 11.35 | 11.35 | 11.35 | 11.35 |
| Percent moisture | 10.4 | 10.4 | 10.4 | 10.4 | 10.4 | 10.4 | 10.4 | 10.4 |
| Dry ore assay, percent $U_3O_8$ | 0.021 | 0.021 | 0.021 | 0.021 | 0.021 | 0.021 | 0.021 | 0.021 |
| Water, liters | 5.3 | 2.25 | None | 0.15 | 0.9 | 1.0 | 1.55 | 1.15 |
| Wash sol'n, liters | None | 6.65 | 9.75 | 8.75 | 8.0 | 7.9 | 7.35 | 7.75 |
| Sulfuric acid, g | 250 | 275 | 275 | 275 | 275 | 275 | 275 | 275 |
| Manganese dioxide, g | 37.5 | 37.5 | 37.5 | 37.5 | 37.5 | 37.5 | 37.5 | 37.5 |
| Final pH | 1.9 | 1.7 | 1.8 | 1.7 | 1.6 | 1.5 | 1.4 | 1.7 |
| Neutralization: | | | | | | | | |
| Limestone, g | 50 | 97.5 | 91.0 | 100.0 | 100.0 | 110.0 | 130.0 | 112.5 |
| pH of pulp | 3.3 | 3.45 | 3.3 | 3.2 | 3.25 | 0.25 | 3.1 | 3.3 |
| Time, min | 80 | 210 | 120 | 150 | 120 | 235 | 210 | 220 |
| Filtration and Washing: | | | | | | | | |
| Leach residues— | | | | | | | | |
| wet, kg | 12.78 | 12.70 | 12.03 | 11.79 | 11.92 | 11.86 | 11.85 | 11.97 |
| dry, kg | 9.99 | 9.93 | 10.09 | 9.87 | 10.18 | 10.15 | 10.16 | 10.06 |
| Assay, percent $U_3O_8$ | 0.0053 | 0.0052 | 0.0048 | 0.0049 | 0.0049 | 0.0058 | 0.0045 | 0.0060 |
| Wash residues assay, percent $U_3O_8$ | | | 0.0055 | 0.0047 | 0.0040 | 0.0039 | 0.0048 | |
| Pregnant sol'n, liters | 6.8 | 6.8 | 6.8 | 6.7 | 6.0 | 6.45 | 6.8 | 6.35 |
| Pregnant sol'n, pH | 3.1 | 3.4 | 3.35 | 3.2 | 3.25 | 3.15 | 3.2 | 3.3 |
| Assay $U_3O_8$, g./l | 0.196 | 0.176 | 0.226 | 0.228 | 0.251 | 0.287 | 0.246 | 0.226 |
| Wash sol'n, liters | 6.65 | 9.75 | 8.75 | 8.0 | 7.9 | 7.35 | 7.75 | 7.1 |
| Wash sol'n, pH | 2.4 | 2.5 | 2.65 | 2.45 | 2.45 | 2.45 | 2.5 | 2.45 |
| Assay $U_3O_8$, g./l | 0.010 | 0.060 | 0.095 | 0.122 | 0.121 | 0.112 | 0.120 | 0.105 |
| Reduction: | | | | | | | | |
| Sulfuric acid, g | 40 | 40 | 40 | 40 | 40 | 40 | 40 | 40 |
| Initial pH | 1.45 | 1.5 | 1.5 | 1.45 | 1.35 | 1.45 | 1.45 | 1.4 |
| Fe powder, g | 5 | 5 | 5 | 5 | 5 | 5 | 5 | 5 |
| Contact time, min | 30 | 30 | 30 | 30 | 30 | 30 | 30 | 30 |
| Final pH | 1.6 | 1.6 | 1.6 | 1.5 | 1.45 | 1.55 | 1.45 | 1.55 |
| Precipitation: | | | | | | | | |
| $Na_4P_2O_7$ | 2.5 | 2.5 | 2.5 | 2.5 | 2.5 | 2.5 | 2.5 | 2.5 |
| Precipitate wet, g | 43 | 16 | 19 | 26 | 24 | 45 | 37 | |
| Barren sol'n, liters | 7.3 | 7.5 | 7.45 | 7.25 | 6.8 | 6.95 | 6.6 | 6.05 |
| Barren sol'n, pH | 1.6 | 1.6 | 1.6 | 1.5 | 1.45 | 1.55 | 1.45 | 1.55 |
| Assay $U_3O_8$, g./l | 0.0069 | 0.0050 | 0.0088 | 0.0077 | 0.010 | 0.012 | 0.011 | 0.0091 |
| Free acid, g./l | 4.0 | 3.4 | 4.1 | 4.2 | 5.2 | 4.2 | 4.2 | 4.2 |

The wet uranous pyrophosphate precipitates from the eight cycles of operation depicted in Table 2 were combined and agitated for 30 minutes with 85 grams of dry sodium hydroxide. This treatment with NaOH served to remove the pyrophosphate radical from the precipitate. After treatment with NaOH the precipitate was diluted with 200 milliliters of water and filtered. 935 milliliters of filtrate were obtained which analyzed 0.0041 gram of $U_3O_8$ per liter. The composite final precipitate assayed 69.8% in $U_3O_8$, 3.2% in $P_2O_5$, 2.47% in Mn, 1.2% in $SiO_2$, 14.9% in $Na_2O$, 0.26% in $K_2O$, 1.44% in $H_2O$, 2.4% in MgO, 1.68% in Fe, 4.7% in $Al_2O_3$, and 0.28% in CaO. This precipitate contained 68.71% of uranium values that were contained in the ore residue that was leached in all of the eight cycles described above. 24.66% of the uranium values in the ore were retained in the leached and washed residues. Analysis of barren and wash solutions which were not recycled in this limited series of locked-batch tests and of other losses which would not be incurred in a commercial scale from which substantially all of the gold had been extracted by cyanide leaching was agitated at about 20% solids with a solution containing 39 pounds of sulfuric acid (sp. gr. 1.84) and 7.5 pounds of manganese dioxide per ton of ore. A leach liquor was thus prepared which had a pH of 3.5 and contained about 0.1 gram of $U_3O_8$, 4 grams of iron, 2 grams of aluminum and 1 gram of silica per liter. This leach liquor was neutralized to pH 6.5 with caustic calcined magnesia. A precipitate was thus obtained which analyzed 1.29% in $U_3O_8$, 16% in $Al_2O_3$, 9.33% in $SiO_2$, and approximately 9% in Fe, 16% in CaO and 13% in MgO. 48 grams of this dried precipitate were mixed with enough water to make a paste. 36 grams of $H_2SO_4$ (sp. gr. 1.84) were added to this paste, and it was baked in a furnace for two hours at 250° C. The baked mass was agitated for two hours with the minimum amount of water, and then filtered. 300 milliliters of filtrate having a pH of 2.2 were thus obtained. The leached residue weighed 17 grams, assayed 0.32% in $U_3O_8$, 25.4% in $SiO_2$ and 10% in $Al_2O_3$. 8.8% of the uranium values were retained in said leached residue. The 300 milliliters of filtrate containing the extracted uranium were further acidified with 2 grams of $H_2SO_4$ (sp. gr. 1.84) to bring its pH down to 1.3, and then agitated for 30 minutes with 5 grams of iron powder. Reaction with the iron powder reduced the dissolved uranium to the uranous state and brought the pH of the solution up to 2. The powdered iron not dissolved in the reduction step was removed by filtration. 2 grams of diammonium phosphate $(NH_4)_2HPO_4$ was added to this reduced solution and 2.24 grams of a precipitate was obtained which analyzed 20.7% in $U_3O_8$, 26.8% in $PO_4$ and 30.9% in $Al_2O_3$. This precipitate contained 75.4% of the uranium that was in the 48 grams of dried precipitate which was used at the start of the present experiment. If desired, this uranous phosphate containing precipitate might be reacted with dry sodium hydroxide to convert the uranous phosphate therein to uranous hydroxide. The solution that remained after this precipitate was filtered off was neutralized with NaOH to a pH of 4.5, and a second precipitate formed which was composed mainly of aluminum phosphate but assayed 1.67% in $U_3O_8$. This second precipitate contained 11.7% of the uranium values that were present in the 48 grams of dried precipitate which were initially used in this experiment. If desired, this second precipitate could be redissolved in sulfuric acid and recycled through the process. The barren liquid that remained after this second precipitate was filtered off contained 4.1% of the uranium values that were present in the 48 grams of dried precipitate with which the experiment was started.

*Example 4*

A cyanided ore residue having the composition given above in the second paragraph of Example 3 was leached with sulfuric acid and manganese dioxide in the manner indicated in Example 3. The leach liquor thus obtained was further reacted with additional $MnO_2$ to convert the iron dissolved therein to the ferric state. This oxidized leach liquor was then neutralized with caustic calcined magnesia to a pH of 3. This caused the ferric iron to precipitate. This ferric precipitate, which contained very little uranium, was filtered off, and the filtrate was further neutralized to a pH of 6.5 with more caustic calcined magnesia. The precipitate thus obtained assayed 4.18% in $U_3O_8$, and approximately 25% in $Al_2O_3$, 15% in $SiO_2$, 2% in Fe, 7% in CaO, and 10% in MgO.

54.6 grams of this head precipitate were slurried with water and agitated for 2 hours with 60 grams of added sulfuric acid (sp. gr. 1.84). 10 grams of limestone was added to produce gypsum which acted as a filter aid. Filtration of this slurry yielded 1500 milliliters of filtrate having a pH of 1.2 and 31.4 grams of leach cake assaying 0.88% in $U_3O_8$ and 23.7% in $SiO_2$. This leach cake contained 12.1% of the uranium values that were present in the 54.6 grams of head precipitate that were extracted.

The 1500 milliliters of filtrate were reacted for 30 minutes with iron turnings in a column to reduce the dissolved uranium therein to the uranous state. This also changed the pH of the filtrate from 1.2 to 1.5. To the reduced filtrate there was added 5 grams of $Na_4P_2O_7$. The wet precipitate containing uranous pyrophosphate thus obtained was mixed with 10 grams of dry sodium hydroxide. A considerable amount of heat was evolved, and after a few minutes of agitation the blue color of the pyrophosphate precipitate disappeared and the brown-black color of uranous hydroxide took its place. The entire mass changed from a wet cake to a dilute slurry. The slurry was further diluted with water and filtered. 3.34 grams of a concentrated precipitate containing uranous hydroxide were thus obtained which assayed 58% in $U_3O_8$ and 13.8% in $P_2O_5$. This precipitate contained 84.8% of the uranium values that were present in the 54.6 grams of head precipitate used at the beginning of the experiment.

The filtrates obtained by filtering off the precipitates containing uranous pyrophosphate and uranous hydroxide were combined and reacted with 4 grams of MgO. A clean-up precipitate was thus obtained which contained 3% of the uranium values present in the 54.6 grams of head precipitate used at the start of this experiment. This clean-up precipitate was dissolved with 10 grams of $H_2SO_4$, and the resultant solution was reduced in a column of iron turnings and added to the reduced liquors obtained in the second cycle of this experiment just prior to the point where the $Na_4P_2O_7$ was added.

In the second cycle of this experiment 54.6 grams of the head precipitate described in the first paragraph of this example were slurried with water and agitated for 2 hours with 69 grams of added sulfuric acid (sp. gr. 1.84). 10 grams of limestone was added to produce gypsum which acted as a filter aid. Filtration of this slurry yielded 1500 milliliters of filtrate having a pH of 1 and 32.2 grams of leach cake assaying 0.18% in $U_3O_8$ and 23.9% in $SiO_2$. This leach cake contained 2.5% of the uranium values that were present in the 54.6 grams of head precipitate that were extracted at the beginning of this second cycle.

The 1500 milliliters of filtrate obtained as indicated in the preceding paragraph were reacted for 15 minutes with iron turnings in a column to reduce the dissolved uranium therein to the uranous state. To the reduced filtrate there was added 1.2 grams of $Na_4P_2O_7$ plus the dissolved and reduced clean-up precipitate from the first cycle of this experiment. A precipitate containing uranous pyrophosphate was thus obtained. This wet uranous pyrophosphate containing precipitate was mixed with 10 grams of dry sodium hydroxide. The uranous pyrophosphate reacted with the sodium hydroxide to form uranous hydroxide, and the entire mass changed from a wet cake to a dilute slurry. The slurry was further diluted with water and filtered. 2.2 grams of a concentrated uranous hydroxide containing precipitate were thus obtained which assayed 63% in $U_3O_8$ and 2.4% in $P_2O_5$. This precipitate contained 58.9% of the uranium values that were present in the 54.6 grams of head precipitate used at the beginning of the second cycle of this experiment.

The filtrates obtained by filtering off the uranous pyrophosphate and uranous hydroxide containing precipitates obtained in the second cycle were combined and reacted with 10 grams of MgO. A clean-up precipitate was thus obtained which weighed 13.3 grams and contained 14.1% of the uranium values present in the 54.6 grams of head precipitate which were extracted at the beginning of the second cycle. The barren solution that remained after the clean-up precipitate was filtered off plus the wash solutions contained about 21% of the uranium values present in the 54.6 grams of head precipitates used at the beginning of the second cycle of this experiment.

In the two cycles of this experiment 71.85% of the uranium values were recovered in the uranous hydroxide concentrate. However, consideration of the uranium values that were in the circulating load to be recycled indicated that a total recovery of 86.1% might be expected.

Resort may be had to such modifications and variations as fall within the spirit of the invention and the scope of the appended claims.

We claim:

1. A process for selectively precipitating uranium values from a sulfuric acid leach liquor which contains a small concentration of dissolved uranium and a much larger concentration of dissolved silicates, iron salts, aluminum salts, and alkaline earth metal salts which comprises adjusting the pH of said leach liquor to between 1 and 1.5, reacting said leach liquor with iron to reduce the dissolved uranium to the uranous state and the dissolved iron to the ferrous state, and then adding a water soluble phosphate to said reduced solution to cause the precipitation of a uranous phosphate.

2. A process as defined in claim 1 in which the sulfuric acid leach liquor is obtained from a low grade uranium containing ore which assays less than 0.2% in $U_3O_8$ and which contains large amounts of quartz gangue and also some foliated silicate minerals, pyrite and carbonaceous material.

3. A process as defined in claim 1 in which the sulfuric acid leach liquor is derived by leaching low grade uranium precipitates which have been obtained by neutralization of the leach liquor obtained from a low grade uranium containing ore which assays less than 0.2% in $U_3O_8$ and which contains large amounts of quartz gangue and also some foliated silicate minerals, pyrite and carbonaceous material.

4. A process for selectively recovering uranium values from a sulfuric acid leach liquor which contains a small concentration of dissolved uranium and a much larger concentration of dissolved silicates, iron salts, aluminum salts, and alkaline earth metal salts which comprises adjusting the pH of said leach liquor to between 1 and 1.5, reacting said leach liquor with iron to reduce the dissolved uranium to the uranous state and the dissolved iron to the ferrous state, adding a water soluble phosphate to said reduced solution to cause the precipitation of a uranous phosphate containing precipitate, and then reacting the uranous phosphate containing precipitate with an alkali metal hydroxide to remove phosphate values therefrom and to convert the uranous phosphate to uranous hydroxide.

5. A process for selectively recovering uranium values from a low grade uranium containing ore which assays less than 0.2% in $U_3O_8$ and which contains large amounts of quartz gangue and also some foliated silicate minerals, pyrite and carbonaceous material which comprises leaching said ore with sulfuric acid to obtain a leach liquor which contains a small concentration of dissolved uranium and a much larger concentration of dissolved silicates, iron salts, aluminum salts, and alkaline earth metal salts, adjusting the pH of said leach liquor to between 1 and 1.5, reacting said leach liquor with iron to reduce the dissolved uranium to the uranous state and the dissolved iron to the ferrous state, adding tetrasodium pyrophosphate to said reduced solution to cause the precipitation of a uranous pyrophosphate containing precipitate, and then reacting the wet uranous pyrophosphate containing precipitate with dry sodium hydroxide to remove pyrophosphate values therefrom and to convert the uranous pyrophosphate to uranous hydroxide.

References Cited in the file of this patent

UNITED STATES PATENTS

| | | |
|---|---|---|
| 1,495,538 | Thews | May 27, 1924 |
| 1,526,943 | Thews | Feb. 17, 1925 |
| 2,176,610 | Stamberg | Oct. 17, 1939 |
| 2,199,696 | Fleck | May 7, 1940 |
| 2,309,988 | Ryan et al. | Feb. 2, 1943 |

OTHER REFERENCES

Britton: Hydrogen Ions, pages 278, 330 (1929). Published by D. Van Nostrand Co., Inc., New York.

Rosenheim et al.: Zeitschrift fur anorganische und allgemeine Chemie, vol. 206, pages 31–43, particularly page 41, (1932).